United States Patent
Miao et al.

(10) Patent No.: US 12,277,435 B2
(45) Date of Patent: Apr. 15, 2025

(54) MANAGEMENT METHOD FOR CDN FUNCTION VIRTUALIZATION, ELECTRONIC DEVICE, AND COMPUTER READABLE MEDIUM

(71) Applicant: ZTE Corporation, Shenzhen (CN)

(72) Inventors: Chuanyang Miao, Shenzhen (CN); Hao Tong, Shenzhen (CN); Guojun Tao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 342 days.

(21) Appl. No.: 17/765,919

(22) PCT Filed: Apr. 6, 2021

(86) PCT No.: PCT/CN2021/085728
§ 371 (c)(1),
(2) Date: Apr. 1, 2022

(87) PCT Pub. No.: WO2021/208780
PCT Pub. Date: Oct. 21, 2021

(65) Prior Publication Data
US 2023/0022113 A1    Jan. 26, 2023

(30) Foreign Application Priority Data
Apr. 14, 2020   (CN) .......................... 202010289126.0

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/45595* (2013.01)

(58) Field of Classification Search
CPC ............... G06F 9/45558; G06F 9/5077; G06F 2009/45595
See application file for complete search history.

(56) References Cited

U.S. PATENT DOCUMENTS

2019/0273635 A1   9/2019   Mcnamee

FOREIGN PATENT DOCUMENTS

| CN | 109525414 A | 3/2019 |
| CN | 109525626 A | 3/2019 |

(Continued)

OTHER PUBLICATIONS

Erich Gamma, "Design Patterns: elements of reusable object-oriented software" Jan. 1, 2000. XP002656793.

(Continued)

*Primary Examiner* — Gregory A Kessler
(74) *Attorney, Agent, or Firm* — CANTOR COLBURN LLP

(57) ABSTRACT

A management method for Content Delivery Network (CDN) function virtualization, including: sending a node creation request to a Mobile/Multi-access Edge Application Orchestrator (MEAO), so that the MEAO controls a Mobile/Multi-access Edge computing Platform (MEP) to perform node instantiation processing to generate a Mobile/Multi-access Edge Computing-CDN (MEC-CDN) node, wherein the MEC-CDN node includes at least one virtualization function module that supports a service operation, and the virtualization function module accesses a storage resource pool via a unified storage access interface provided by a storage resource management module (S101); and connecting the MEC-CDN node to a CDN (S102). Further provided are a CDN management node, an MEAO, an MEP, an electronic device, and a computer readable medium.

20 Claims, 7 Drawing Sheets

(56) References Cited

FOREIGN PATENT DOCUMENTS

| CN | 109995671 A | 7/2019 |
|---|---|---|
| CN | 112506604 A | 3/2021 |
| EP | 3462311 A1 | 4/2019 |
| WO | 2016048430 A1 | 3/2016 |

OTHER PUBLICATIONS

European Search Report for corresponding application EP21788185; Report dated Nov. 18, 2022.
International Search Report for corresponding application PCT/CN2021/085728 filed Apr. 6, 2021; Mail date Jul. 6, 2021.

Fig. 8
CDN management node
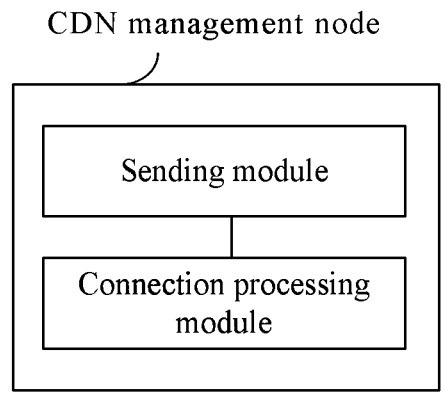
Fig. 9
MEAO
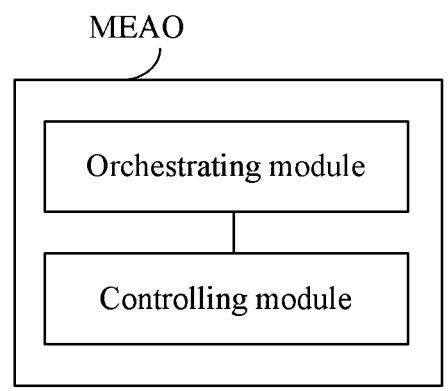
MEP
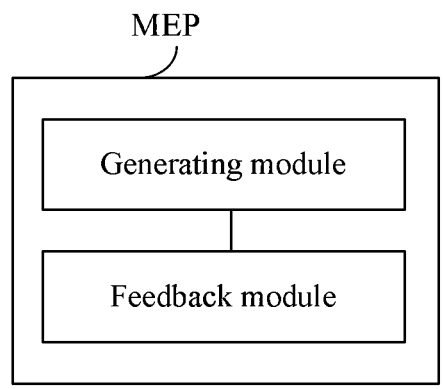
Fig. 10

MANAGEMENT METHOD FOR CDN FUNCTION VIRTUALIZATION, ELECTRONIC DEVICE, AND COMPUTER READABLE MEDIUM

CROSS REFERENCE

This application is a National Stage Filing of the PCT International Application No. PCT/CN2021/085728 filed on Apr. 6, 2021, which claims priority to Chinese Application No. 202010289126.0 filed on Apr. 14, 2020, the entirety of which is herein incorporated by reference.

TECHNICAL FIELD

The present disclosure relates to the field of communications technologies, and in particular, to a management method for Content Delivery Network (CDN) function virtualization, a CDN management node, a Mobile/Multi-access Edge Application Orchestrator (MEAO), a Mobile/Multi-access Edge computing Platform (MEP), an electronic device, and a computer readable medium.

BACKGROUND

The Content Delivery Network (CDN) has been used for many years in fields such as Internet audio and video transmission and Internet Protocol Television (IPTV) network media transmission. The core idea of the CDN is to push content to a service node nearest to a user so that the user can access the content nearby.

At present, sinking of the CDN service nodes is a common requirement of almost all CDN service providers. However, the sinking of the CDN service node enables content to be closer to the user on the one hand, but increases the number of CDN nodes on the other hand, which increases the difficulty of node management and also increases the investment.

If a traditional mode of adding physical nodes is used, operations such as capacity evaluation, hardware selection, later-stage installation and update of software, and manual online operation need to be performed in advance, which is very inconvenient. In addition, in a traditional CDN node construction method, a single CDN node adopts a node-specific storage system, some hot content needs high Input/Output (I/O) throughput quality assurance, while some normal content only needs normal I/O throughput quality, and the capacity is customized and is difficult to change. After the sinking of the nodes, if the same physical device is configured for each node, the I/O quality and capacity customization of the node become very complex, and the cost is also very high.

SUMMARY

Embodiments of the present disclosure provide a management method for CDN function virtualization, a CDN management node, an MEAO, an MEP, an electronic device, and a computer readable medium, which can solve at least one of the technical problems in the related art.

According to a first aspect, the embodiments of the present disclosure provide a management method for CDN function virtualization, including:

sending a node creation request to an MEAO, so that the MEAO controls an MEP to perform node instantiation processing to generate a Mobile/Multi-access Edge Computing-CDN (MEC-CDN) node, wherein the MEC-CDN node includes at least one virtualization function module that supports a service operation, and the virtualization function module accesses a storage resource pool via a unified storage access interface provided by a storage resource management module; and connecting the MEC-CDN node to a CDN.

According to a second aspect, the embodiments of the present disclosure provide a management method CDN function virtualization, including:

in response to a node creation request sent by a CDN management node, performing resource orchestration according to the node creation request; and controlling an MEP to perform node instantiation processing so as to generate an MEC-CDN node, wherein the MEC-CDN node includes at least one virtualization function module that supports a service operation, and the virtualization function module accesses a storage resource pool via a unified storage access interface provided by a storage resource management module.

According to a third aspect, the embodiments of the present disclosure provide a management method CDN function virtualization, including:

in response to control of an MEAO, performing node instantiation processing to generate an MEC-CDN node, wherein the MEC-CDN node includes at least one virtualization function module that supports a service operation, and the virtualization function module accesses a storage resource pool via a unified storage access interface provided by a storage resource management module; and feeding back MEC-CDN node generation state information to the MEAO.

According to a fourth aspect, the embodiments of the present disclosure provide a CDN management node, including:

a sending module, configured to send a node creation request to an MEAO, so that the MEAO controls an MEP to perform node instantiation processing to generate an MEC-CDN node, wherein the MEC-CDN node includes at least one virtualization function module that supports a service operation, and the virtualization function module accesses a storage resource pool via a unified storage access interface provided by a storage resource management module; and a connection processing module, configured to connect the MCE-CDN node to a CDN.

According to a fifth aspect, the embodiments of the present disclosure provide an MEAO, including:

an orchestrating module, configured to, in response to a node creation request sent by a CDN management node, perform resource orchestration according to the node creation request; and a controlling module, configured to control an MEP to perform node instantiation processing so as to generate an MEC-CDN node, wherein the MEC-CDN node includes at least one virtualization function module that supports a service operation, and the virtualization function module accesses a storage resource pool via a unified storage access interface provided by a storage resource management module.

According to a sixth aspect, the embodiments of the present disclosure provide an MEP, including:

a generating module, configured to, in response to control of an MEAO, perform node instantiation processing to generate an MEC-CDN node, wherein the MEC-CDN node includes at least one virtualization function module that supports a service operation, and the virtualization function module accesses a storage resource pool via a unified storage access interface provided by a storage resource management module; and a feedback module, configured to feed back MEC-CDN node generation state information to the MEAO.

According to a seventh aspect, the embodiments of the present disclosure provide an electronic device, including:

one or more processors; and a memory, on which one or more programs are stored, wherein the one or more processors, when executing the one or more programs, implement a management method as provided in the first aspect to the third aspect.

According to an eighth aspect, the embodiments of the present disclosure provide a computer readable medium, on which a computer program is stored, wherein when the program is executed by a processor, the management method according to the first aspect to the third aspect is implemented.

BRIEF DESCRIPTION OF THE DRAWINGS

FIG. 8 is a structural block diagram of a CDN management node according to some embodiments of the present disclosure;

FIG. 9 is a structural block diagram of an MEAO according to some embodiments of the present disclosure;

FIG. 10 is a structural block diagram of an MEP according to some embodiments of the present disclosure.

DETAILED DESCRIPTION

To make those having ordinary skill in the art better understand the technical solution of the embodiments of the present disclosure, the following describes in detail a management method for CDN function virtualization, a CDN management node, an MEAO, an MEP, an electronic device, and a computer readable medium provided in the present disclosure with reference to the accompanying drawings.

Exemplary embodiments will be described more fully hereinafter with reference to the accompanying drawings, but the exemplary embodiments may be implemented in various forms and should not be construed as limited to the embodiments set forth herein. Rather, these embodiments are provided so that the technical solution of the present disclosure will be thorough and complete, and will fully convey the scope of the present disclosure to those having ordinary skill in the art.

The embodiments of the present disclosure and the features in the embodiments may be combined with each other without conflict.

As used herein, the term "and/or" includes any and all combinations of one or more of the listed items.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "include/include" and/or "be made of . . . " when used in this description specify the presence of stated features, integers, operations, operations, elements, and/or components, but do not preclude the presence or addition of one or more other features, integers, operations, operations, elements, components, and/or combinations thereof.

Unless otherwise defined, all terms (including technical and scientific terms) used herein have the same meaning as commonly understood by those having ordinary skill in the art. It will also be understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1A:
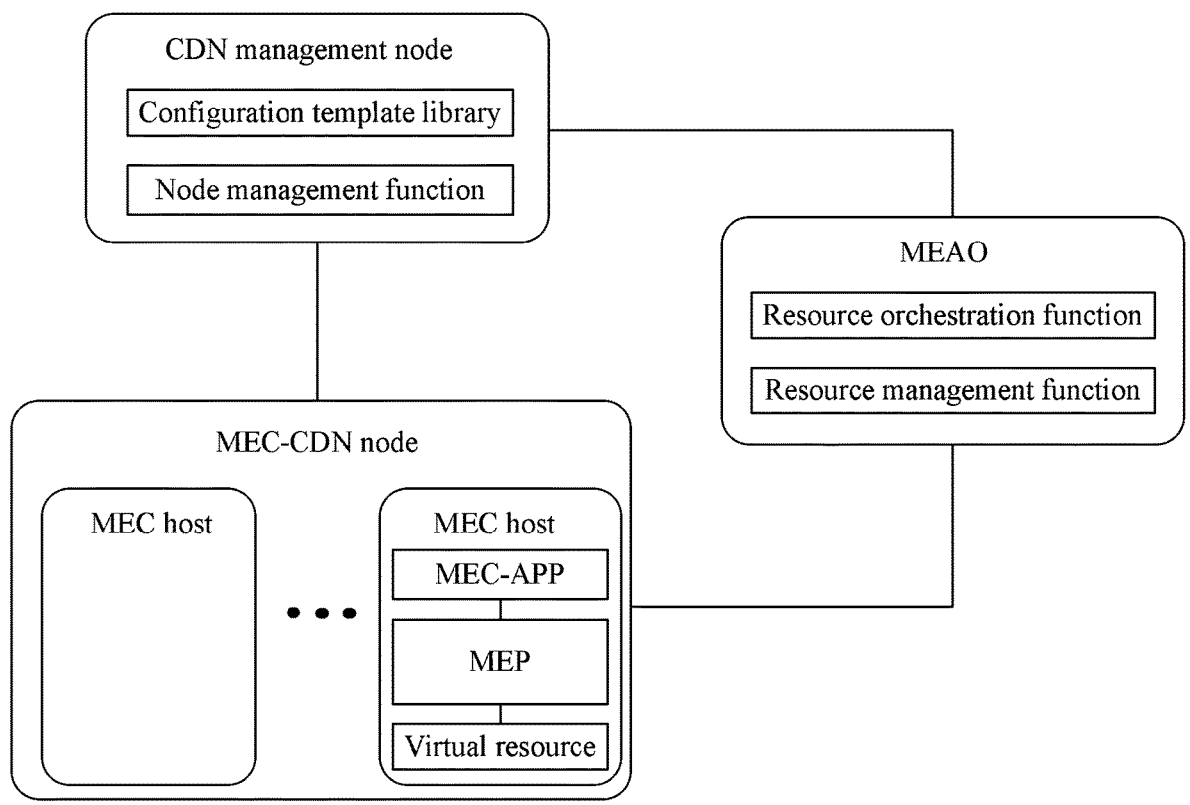
FIG. 1a is a schematic diagram of logical function architecture of multiple entities involved in the technical solution of the embodiments of the present disclosure.
Figure 1B:
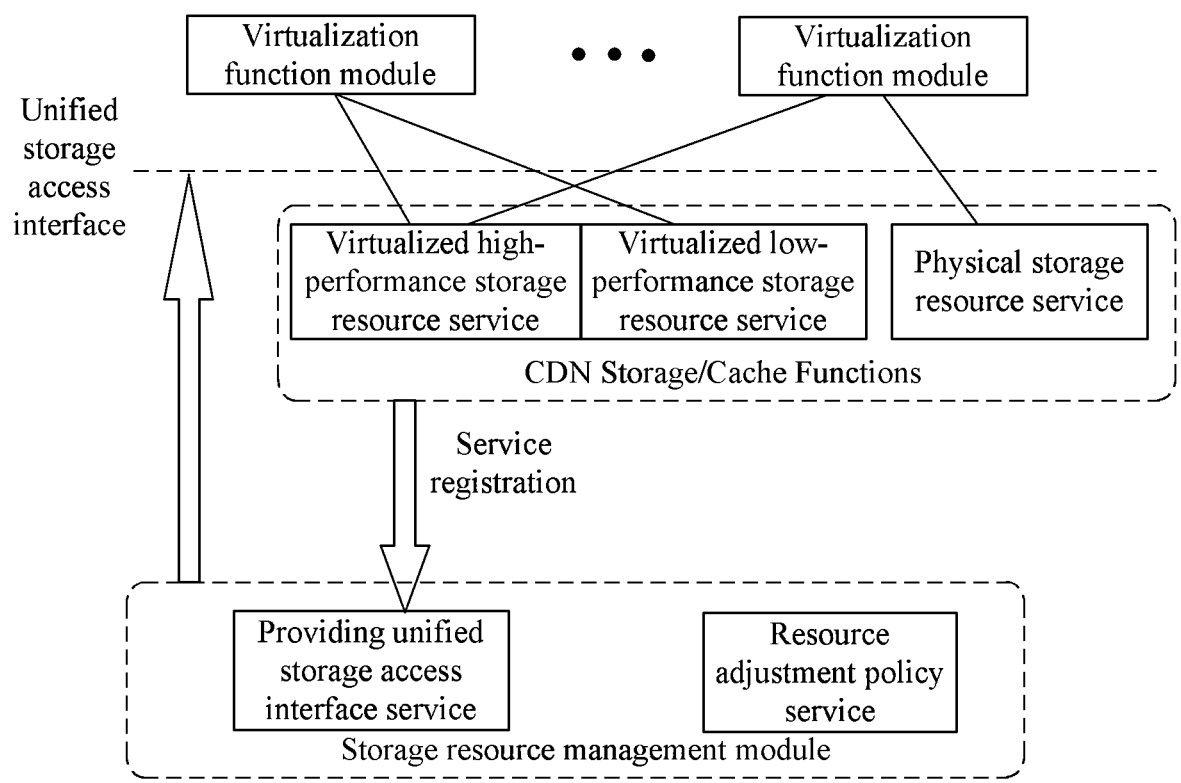
FIG. 1b is a schematic diagram of logical function architecture of an MEC-CDN node in the technical solution of the embodiments of the present disclosure.

The technical solution of the embodiments of the present disclosure is a combination of a CDN technology and an MEC technology. FIG. 1a is a schematic diagram of logical function architecture of multiple entities involved in the technical solution of the embodiments of the present disclosure. FIG. 1b is a schematic diagram of logical function architecture of an MEC-CDN node in the technical solution of the embodiments of the present disclosure. As shown in FIG. 1a and FIG. 1b, the technical solution of the embodiments of the present disclosure involves entities including a CDN management node (also referred to as a CDN center node), an MEAO and an MEC-CDN node.

The CDN management node has a management function for CDN nodes, and provides a configuration template used for creating an MEC-CDN node (within the CDN management node, multiple different configuration templates are stored in advance according to different requirements). In the embodiments of the present disclosure, the CDN management node is mainly responsible for activating a process of creating a new MEC-CDN node (based on a preset rule, determining whether it is necessary to create a new MEC-CDN node, and activating a creation process in a case where it is necessary to create a new MEC-CDN node), configuring parameters for the new MEC-CDN node to be created (a creation rule is provided in the CDN management node for determining a configuration template corresponding to the MEC-CDN to be created, and generating a node creation request), and maintaining stored configuration templates.

The MEAO has functions of orchestrating, managing and monitoring a virtual resource, and instructing an MEP to instantiate an MEC-CDN node. In the embodiments of the present disclosure, the MEAO may orchestrate and reserve virtual resources in a virtual resource pool according to the node creation request sent by the CDN management node, and control an MEP to instantiate an MEC-CDN node based on the orchestrated resources.

The MEC-CDN node is a virtualization node, which may be composed of one or more virtualization function modules that support a service operation. In essence, the MEC-CDN node includes: an MEC Host, an MEP, a virtual basic resource, and a virtualization function module running on the MEP. The MEC host is responsible for loading the MEP.

The MEP provides an operating environment of an MEC-based CDN node, and also provides the capability of externally exposing CDN services. Specifically, the MEP can complete the instantiation of the virtualization function module contained in an MEC-CDN node under the instruction of the MEAO, and provide a software platform for the virtualization function module. In the embodiments of the present disclosure, the instantiated virtualization function module runs on the MEP in the form of a Multi-access Edge Computing Application (MEC-APP). The MEC-APP is used for realizing various basic capabilities of the MEC-CDN node, and finally provides a service externally as a logical service node. The MEC-APP exposes the service through the MEP.

Each virtualization function module at least has a storage function and a computing function. The storage function includes a hard disk storage function and a buffer function. The computing function includes at least one of the following: a service load balancing function, a storage function, a distribution function, a delivery function, and a media content management (including content processing) function. Of course, part of functions may be added and deleted according to actual deployment requirements. It should be noted that, in the embodiments of the present disclosure, the "storage resources" include both hard disk storage resources and buffer resources.

According to different supported services, the virtualization function module can be divided into a virtualization function module supporting an IPTV service, a virtualization function module supporting an Over The Top (OTT) video service, a virtualization function module supporting a Virtual Reality (VR) live broadcast service, etc. According to different service capabilities, the virtualization function module may be divided into a virtualization function module having a scheduling service function, a virtualization function module having a content management service function, a virtualization function module having a media service function, etc.

These virtualization function modules (MEC-APPs) may be deployed on one MEP or different MEPs, and provide corresponding services externally through a unified MEC-CDN node scheduling function. Some of the virtualization function modules may register with the MEP to provide, based on their own functions, a service to other applications.

It should be noted that, in the technical solution of the embodiments of the present disclosure, the MEP may further provide some universal services, for example, local Domain Name System (DNS) resolution, support for access to an underlying resource, and provision of a policy for managing and controlling traffic.

The technical solution of the present disclosure will be described in detail below with reference to exemplary embodiments. In the following content, for ease of description, the use of a virtualization function module as an MEC-APP is taken as an example for description.

Figure 2:
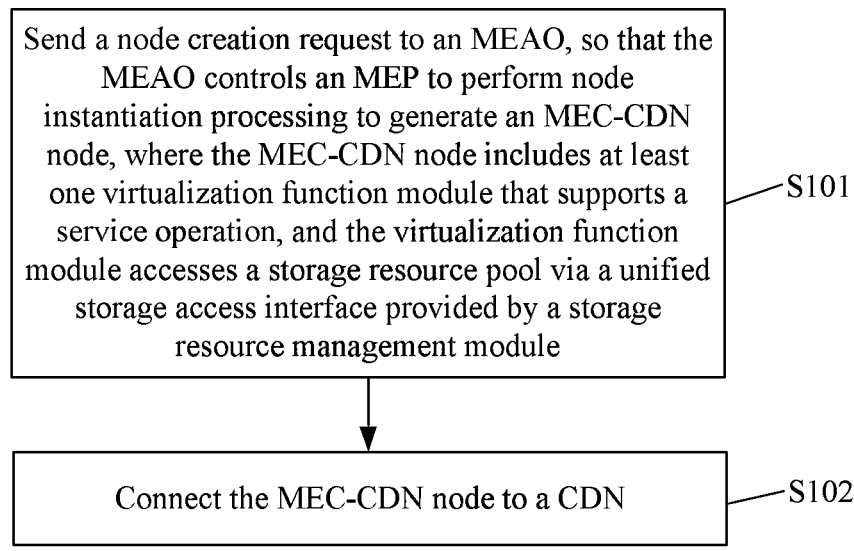
FIG. 2 is a flowchart of a management method for CDN function virtualization according to some embodiments of the present disclosure.

FIG. 2 is a flowchart of a management method for CDN function virtualization according to some embodiments of the present disclosure. As shown in FIG. 2, the management method is applied to a CDN management node. The management method includes operations S101 and S102.

At S101, a node creation request is sent to a MEAO, so that the MEAO controls an MEP to perform node instantiation processing to generate an MEC-CDN node, wherein the MEC-CDN node includes at least one virtualization function module that supports a service operation, and the virtualization function module accesses a storage resource pool via a unified storage access interface provided by a storage resource management module.

The storage resource pool is a virtualized resource pool including storage resources provided by one or more physical devices having a storage function. Before an MEC-CDN node is generated, a certain algorithm can be used to evaluate storage resources required by the MEC-CDN node to be generated, and then a storage resource pool dedicated to the MEC-CDN node is constructed according to the evaluation result (the capacity of the storage resource pool is customized).

At S102, the MCE-CDN node is connected to the CDN.

After the MCE-CDN node is generated, service initialization needs to be performed so as to provide a service externally, wherein the service initialization needs to be performed by a CDN management node. Afterwards, the MEC-CDN node will be connected to the original CDN architecture to serve as a new CDN node. After the connection, the MEC-CDN node, like other normal CDN nodes in the CDN, will provide various services to users. The specific connection process belongs to a conventional technology in the art, and thus is not repeated herein. The technical solution of the embodiments of the present disclosure can realize quick and dynamic supporting and expanding of various services in a CDN.

In addition, in the embodiments of the present disclosure, an MEC-APP in an MEC-CDN node accesses a storage resource pool via a unified storage access interface. The unified storage access interface can shield, for an upper-layer MEC-APP, performance differences of different bottom-layer storage devices that constitute the storage resource pool, so that all MEC-APPs in the MEC-CDN node can share the same storage resource pool. In this case, a storage resource allocated to each MEC-APP can be dynamically adjusted, so that the MEC-APP can provide a most suitable storage access service for a user, thereby effectively utilizing an actual storage space to the maximum extent.

In some embodiments, the storage resource pool includes: a virtual storage resource pool and/or a physical storage resource pool. That is, the storage resources in the storage resource pool may be pure virtual storage resources, pure physical storage resources, or a combination of virtual storage resources and physical storage resources. The physical storage resources are provided by a dedicated physical storage device, and an access interface of the physical storage resources is independent of an access interface of the virtual storage resources.

In some embodiments, the virtual storage resource pool includes: a virtualized high-performance storage resource and a virtualized low-performance storage resource. A performance parameter of the virtualized high-performance storage resource is superior to (better than) a preset performance index, and a performance parameter of the virtualized low-performance storage resource is inferior to (worse than) the preset performance index. As an example, the performance parameter is embodied as a read/write speed of a storage device, and the preset performance index is set as 600 M/s. The virtualized high-performance storage resource refers to a storage resource with a read/write speed greater than 600 M/s, and the virtualized low-performance storage resource refers to a storage resource with a read/write speed less than or equal to 600 M/s. Of course, in the embodiments of the present disclosure, the performance parameter for dividing the high/low-performance storage resource may adopt another parameter, which will not be described herein by way of example.

In some embodiments, the unified storage access interface includes one or a combination of the following: a first access interface, a second access interface, and a third access interface. The first access interface is configured for the virtualization function module to access the virtualized high-performance storage resource. The second access interface is configured for the virtualization function module to access the virtualized low-performance storage resource. The third access interface is configured for the virtualization function module to directly access a physical storage resource in the physical storage resource pool. In practical applications, the combination of these access interfaces can be configured automatically according to the change of the storage resources.

In some embodiments, multiple different configuration templates are pre-stored in a CDN management node, and each configuration template can be used for generating a corresponding MGC-CDN node. The configuration template records a configuration scheme of the corresponding MEC-CDN node, and the configuration scheme at least includes one or more of the following contents: computing resources for implementing various service functions, network bandwidth resources required for transmitting data, storage space resources for content storage, storage I/O throughput bandwidth, and the like. In a case where the CDN management node determines that the CDN network needs to create a new MEC-CDN node, the CDN management node can determine a suitable configuration template according to actual needs, add address information of the determined configuration template into a node creation request, and send the node creation request to the MEAO.

After receiving the node creation request, the MEAO obtains the configuration template of the MEC-CDN node to be generated according to the address information included in the node creation request. Therefore, between operation S101 and operation S102, the method may further include an operation S101a, in which a configuration template of the MEC-CDN node to be generated is provided to MEAO.

As an exemplary implementation of configuring the storage resource management module, a first generation instruction is recorded in the configuration template, and the MEAO may control, according to the first generation instruction, the MEP to configure, in a platform of the MEP, the storage resource management module. The upper-layer APP needs to go through an operation of "discovering", so that the storage resource management module configured by the MEP can be used.

As another exemplary implementation of configuring the storage resource management module, a second generation instruction is recorded in the configuration template, and the MEAO may control, according to the second generation instruction, the MEP to instantiate the storage resource management module by taking the storage resource management module as a virtualization function module. The storage resource management module can provide a unified storage access interface for the MEC-APPs of different upper-layer services to access the storage resource pool by means of registering with the MEP to become a universal storage management service, thereby realizing providing a storage service externally.

As another exemplary implementation of configuring the storage resource management module, a third generation instruction is recorded in the configuration template, so that the MEAO may control, according to the third generation instruction, a virtual abstraction layer of the storage resource pool to configure the storage resource management module. The storage resource management module directly takes over an access path of a bottom-layer resource, so that an upper-layer service, regardless of differences in the bottom-layer resources, can access the storage resource via this interface, that is, the storage resource management module may serve as a universal storage service capability that provides a reading service for the upper-layer services to directly access the storage resources.

That is, the storage resource management module may exist as a platform-level service function of the MEP, or may run on the MEP as a virtualization function module in the MEC-CDN node, or may be deployed, as a file system function, in a virtual abstraction layer for controlling the storage resource pool.

In some embodiments, the storage resource management module is further configured with storage resource adjustment policy data, and the storage resource adjustment policy data is used for the storage resource management module to dynamically adjust, according to a preset adjustment policy, a storage resource allocated by each virtualization function module in the MEC-CDN node.

In practical applications, the storage resource management module may dynamically adjust the storage resources allocated by at least one of the MEC-CDN nodes in response to an adjustment request sent by an external function module (e.g. an MEC-APP, a CDN management node, or another logic module of the MEC service system). Alternatively, a monitoring function module is configured in the MEC system, and the monitoring function module can monitor an access situation (for example, the number of times, within a unit period, of accessing certain specific contents in the MEC-APP, requested traffic, etc.) of each MEC-APP in the MEC-CDN node, and generate monitoring data. The storage resource management module dynamically adjusts the storage resources allocated by the MEC-APP according to the monitoring data and based on a preset storage resource adjustment policy. Exemplarily, in a case where the number of times, within a unit period, of accessing a specific content in the MEC-APP is greater than a first preset threshold of the number of times, capacity expansion may be performed on the storage I/O throughput bandwidth allocated by the MEC-APP. In a case where the number of times, within a unit period, of accessing a specific content in the MEC-APP is smaller than a second preset threshold of the number of times (smaller than the first preset threshold of the number of times), capacity reduction may be performed on the storage I/O throughput bandwidth allocated by the MEC-APP. In a case where requested traffic of specific content in the MEC-APP within a unit period is greater than a first preset traffic threshold, capacity expansion may be performed on a storage space allocated to the MEC-APP. In a case where the number of times, within a unit period, of accessing a specific content in the MEC-APP is smaller than a second preset traffic threshold (smaller than the first preset traffic threshold), capacity reduction may be performed on the storage space allocated by the MEC-APP. It should be noted that, the technical solution of the embodiments of the present disclosure is not limited to a specific storage resource adjustment policy.

In the embodiments of the present disclosure, the operation of dynamically adjusting the storage resources allocated by the virtualization function module includes at least one of the following: adjusting a size of a storage space, adjusting an access path, adjusting an I/O bandwidth, and adjusting or migrating the storage device. Definitely, in a case where the storage resource pool includes a virtual storage resource, the adjustment to the storage resource allocated by the virtualization function module may further include adjustment to a ratio of the allocated virtualized high-performance storage resource to the allocated virtualized low-performance storage resource.

Figure 3:
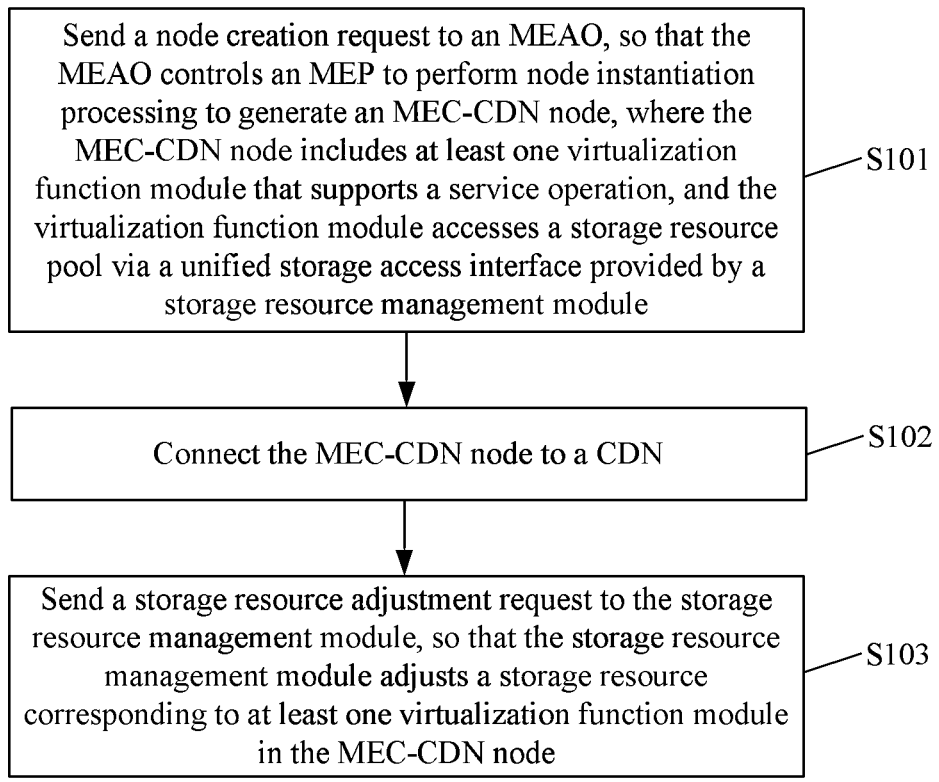
FIG. 3 is a flowchart of another management method for CDN function virtualization according to some embodiments of the present disclosure.

FIG. 3 is a flowchart of another management method for CDN function virtualization according to some embodiments of the present disclosure. As shown in FIG. 3, the management method is applied to a CDN management node. The management method not only includes operation S101 and operation S102, but also includes operation S103. Only operation S103 is described in detail below.

At S103, a storage resource adjustment request is sent to a storage resource management module, so that the storage resource management module adjusts a storage resource corresponding to at least one virtualization function module in an MEC-CDN node.

In the embodiments of the present disclosure, the CDN management node may adjust the storage resources allocated by each MEC-APP in the MEC-CDN node according to actual needs.

Figure 4:
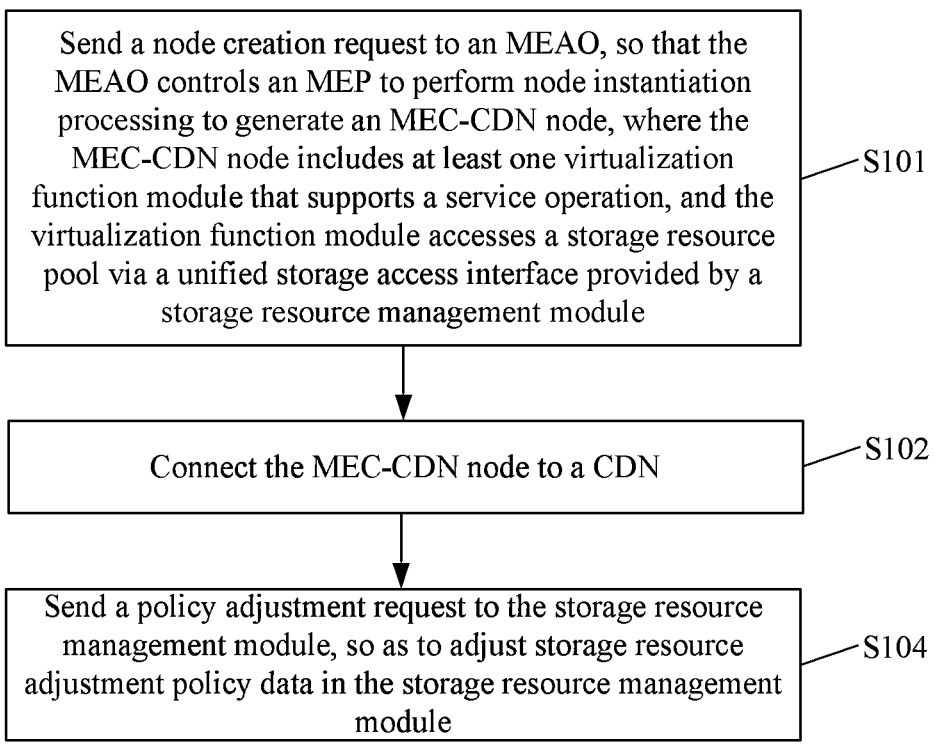
FIG. 4 is a flowchart of still another management method for CDN function virtualization according to some embodiments of the present disclosure.

FIG. 4 is a flowchart of still another management method for CDN function virtualization according to some embodiments of the present disclosure. As shown in FIG. 4, the management method is applied to a CDN management node. The management method not only includes operation S101 and operation S102, but also includes operation S104. Only operation S104 is described in detail below.

At S104, a policy adjustment request is sent to the storage resource management module, so as to adjust storage resource adjustment policy data in the storage resource management module.

In a case where storage resource adjustment policy data is configured in the storage resource management module, the CDN management node may adjust storage resource adjustment policy data stored in the storage resource management module according to an actual need.

It should be noted that, different operations in the embodiments shown in FIG. 2 to FIG. 4 may be combined, and technical solutions obtained through combination shall also belong to the scope of protection of the present disclosure.

Figure 5:
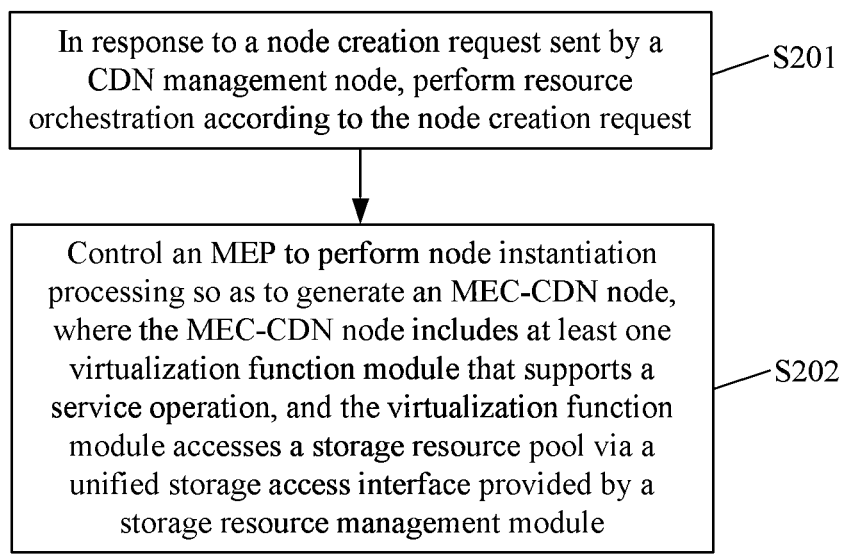
FIG. 5 is a flowchart of still another management method for CDN function virtualization according to some embodiments of the present disclosure.

FIG. 5 is a flowchart of still another management method for CDN function virtualization according to some embodiments of the present disclosure. As shown in FIG. 5, the management method is applied to an MEAO. The management method includes operations S201 and S202.

At S201, in response to a node creation request sent by a CDN management node, resource orchestration is performed according to the node creation request.

At S202, an MEP is controlled to perform node instantiation processing so as to generate an MEC-CDN node, wherein the MEC-CDN node includes at least one virtualization function module that supports a service operation, and the virtualization function module accesses a storage resource pool via a unified storage access interface provided by a storage resource management module.

In some embodiments, before operation S202, in a case where the MEAO determines that no MEP exists in the MEC host, the MEAO may control the MEC host to create an MEP first, and then instruct the MEP to perform node instantiation processing.

In some embodiments, address information of a configuration template is recorded in the node creation request, and operation S201 includes: the configuration template is obtained according to the address information; and resource orchestration is performed according to the configuration template.

As an exemplary implementation of configuring the storage resource management module, a first generation instruction is recorded in the configuration template, and the management method further includes: an MEP is controlled, according to the first generation instruction, to configure in a platform of the MEP a storage resource management module.

As another exemplary implementation of configuring the storage resource management module, a second generation instruction is recorded in the configuration template, and operation S202 includes: an MEP is controlled, according to the second generation instruction, to instantiate the storage resource management module by taking the storage resource management module as a virtualization function module.

As another exemplary implementation of configuring the storage resource management module, a third generation instruction is recorded in the configuration template, and the method further includes: a virtual abstraction layer of the storage resource pool is controlled, according to the third generation instruction, to configure the storage resource management module.

In some embodiments, the storage resource management module is further configured with storage resource adjustment policy data, and the storage resource adjustment policy data is used for the storage resource management module to dynamically adjust, according to a preset adjustment policy, a storage resource allocated by each virtualization function module in the MEC-CDN node.

In some embodiments, the storage resource pool includes: a virtual storage resource pool and/or a physical storage resource pool.

In some embodiments, the virtual storage resource pool includes: a virtualized high-performance storage resource and a virtualized low-performance storage resource. A performance parameter of the virtualized high-performance storage resource is superior to (better than) a preset performance index, and a performance parameter of the virtualized low-performance storage resource is inferior to (worse than) the preset performance index.

In some embodiments, the unified storage access interface includes one or a combination of the following: a first access interface, a second access interface, and a third access interface. The first access interface is configured for the virtualization function module to access the virtualized high-performance storage resource. The second access interface is configured for the virtualization function module to access the virtualized low-performance storage resource. The third access interface is configured for the virtualization function module to directly access a physical storage resource in the physical storage resource pool. In practical applications, the combination of these access interfaces can be configured automatically according to the change of the storage resources.

Figure 6:
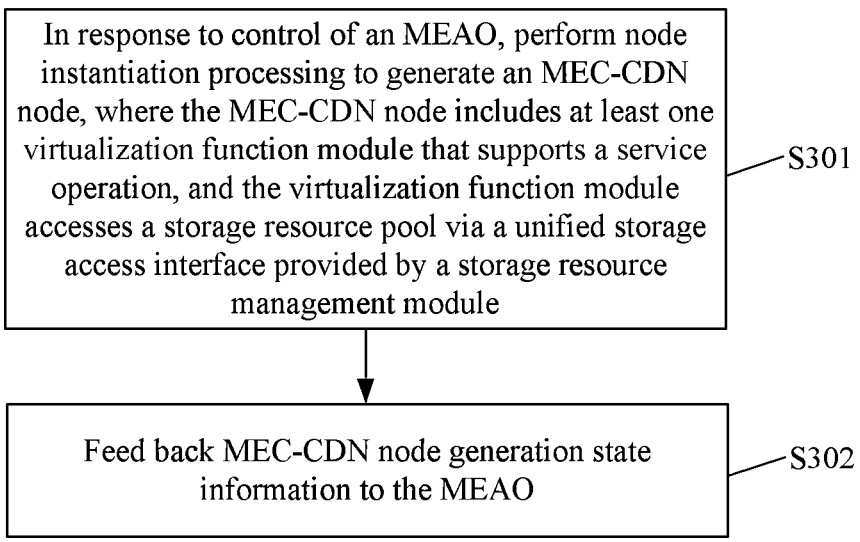
FIG. 6 is a flowchart of still another management method for CDN function virtualization according to some embodiments of the present disclosure.

FIG. 6 is a flowchart of still another management method for CDN function virtualization according to some embodiments of the present disclosure. As shown in FIG. 6, the management method is applied to an MEP, and the management method includes operations S301 and S302.

At S301, in response to control of an MEAO, node instantiation processing is performed to generate an MEC-CDN node, wherein the MEC-CDN node includes at least one virtualization function module that supports a service operation, and the virtualization function module accesses a storage resource pool via a unified storage access interface provided by a storage resource management module.

At S302, MEC-CDN node generation state information is fed back to the MEAO.

The MEC-CDN node generation state information includes metadata information of the MEC-CDN node, such as an IP address, a port, and current capability state monitoring data. The MEAO will also feed the received MEC-CDN node generation state information back to the CDN management node, so as to inform the CDN management node that the MEC-CDN node has been generated.

As an exemplary implementation for configuring the storage resource management module, the management method further includes: the storage resource management module is configured in a platform of the MEP in response to control of the MEAO.

As another exemplary implementation of configuring the storage resource management module, in a process of performing node instantiation processing in operation S301, the storage resource management module is instantiated by taking the storage resource management module as a virtualization function module.

As another exemplary implementation of configuring the storage resource management module, the storage resource management module is configured in a virtual abstraction layer of the storage resource pool.

In some embodiments, the storage resource management module is further configured with storage resource adjustment policy data, and the storage resource adjustment policy data is used for the storage resource management module to dynamically adjust, according to a preset adjustment policy, a storage resource allocated by each virtualization function module in an MEC-CDN node.

In a case where the storage resource management module is deployed as a part of the MEP, the management method further includes: a policy adjustment request sent by the CDN management node is received, and the storage resource adjustment policy data stored by the storage resource management module in the platform of the MEP itself is adjusted according to the policy adjustment request.

In some embodiments, the storage resource pool includes: a virtual storage resource pool and/or a physical storage resource pool.

In some embodiments, the virtual storage resource pool includes: a virtualized high-performance storage resource and a virtualized low-performance storage resource. A performance parameter of the virtualized high-performance storage resource is superior to (better than) a preset performance index, and a performance parameter of the virtualized low-performance storage resource is inferior to (worse than) the preset performance index.

In some embodiments, the unified storage access interface includes one or a combination of the following: a first access interface, a second access interface, and a third access interface. The first access interface is configured for the virtualization function module to access the virtualized high-performance storage resource. The second access interface is configured for the virtualization function module to access the virtualized low-performance storage resource. The third access interface is configured for the virtualization function module to directly access a physical storage resource in the physical storage resource pool. In practical applications, the combination of these access interfaces can be configured automatically according to the change of the storage resources.

Figure 7:
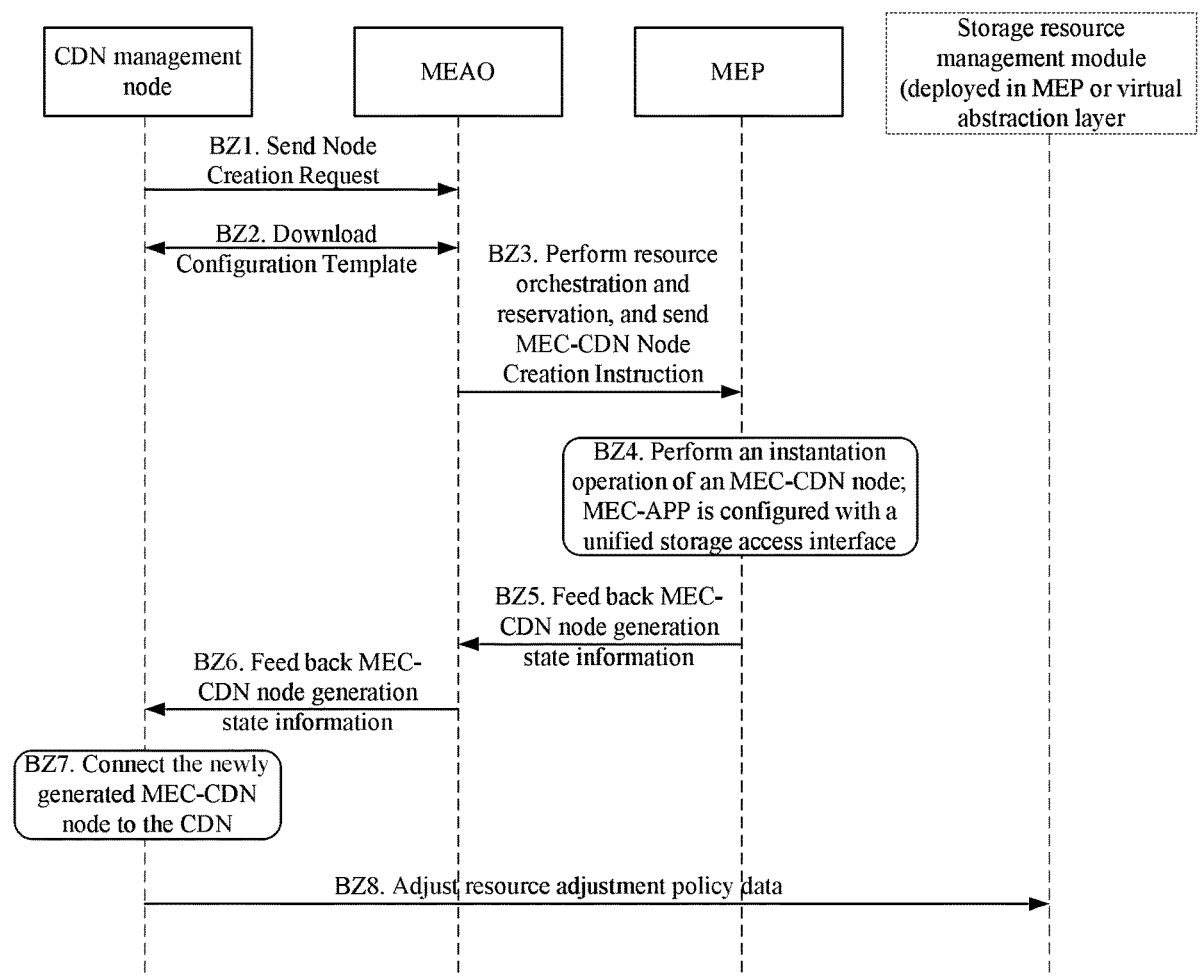
FIG. 7 is a signaling diagram of a management method for CDN function virtualization according to some embodiments of the present disclosure.

FIG. 7 is a signaling diagram of a management method for CDN function virtualization according to some embodiments of the present disclosure. As shown in FIG. 7, the management method includes operations BZ1 to BZ8.

At BZ1, a CDN management node sends a node creation request to an MEAO, wherein download address information of a node configuration template is attached in the node creation request.

At BZ2, the MEAO downloads a configuration template of an MEC-CDN node to be created according to the address information of the configuration template in the node creation request.

At BZ3, the MEAO configures resource planning according to the ability of the MEC-CDN node in the configuration template, performs orchestration and reservation of required resources in a virtual resource pool (including a storage resource pool), the resources including a computing resource, a network resource, a storage resource, etc., and sends an MEC-CDN node creation instruction to an MEP.

It should be noted that, in the embodiments of the present disclosure, establishment of a virtual storage resource needs to comply with a service requirement. The virtual storage resource may be divided into a virtualized high-performance storage resource and a virtualized low-performance storage resource. A ratio of the two kinds of storage resources allocated by each virtualization function module in the MEC-CDN node may be determined according to a ratio defined in the configuration template of the MEC-CDN node, and may also be determined according to a universal default value. However, in the later change of demands, the ratio may be adjusted according to an adjustment request sent by an external function module (the MEC-APP, the CDN management node, or another logic module of the MEC service system), or may be dynamically adjusted according to a storage resource adjustment policy.

At BZ4, after receiving the MEC-CDN node creation instruction, the MEP performs the instantiation operation of the MEC-CDN node according to the requirements of node creation and the reserved resources.

The MEP instantiates each storage resource management module included in the MEC-CDN node as a MEC-APP, and these MEC-APPs run on the MEP.

While executing operation BZ4, the deployment of the storage resource management module is also completed. As an exemplary implementation, the storage resource management module may exist as a platform-level service function of the MEP, or may run on the MEP as a virtualization function module in the MEC-CDN node, or may be deployed, as a file system function, in a virtual abstraction layer for controlling the storage resource pool.

The storage resource management module may provide a unified storage access interface for the MEC-APPs included in the MEC-CDN node, so that these MEC-APPs can access the storage resource pool via the unified storage access interface.

In addition, the storage resource management module may also pre-store storage resource adjustment policy data. The storage resource management module can dynamically adjust the storage resources allocated by each MEC-APP based on the monitoring data of each MEC-APP provided by the MEC system and based on the storage resource adjustment policy.

Definitely, the storage resource management module may further adjust, according to an adjustment request sent by an external function module (the MEC-APP, the CDN management node, or another logic module of the MEC service system), the storage resource allocated by the corresponding MEC-APP. The operation of dynamically adjusting the storage resources allocated by the MEC-APP includes at least one of the following: adjusting a size of a storage space, adjusting an access path, adjusting an I/O bandwidth, and adjusting or migrating a storage device.

In some embodiments, the storage resource pool includes: a virtual storage resource pool and/or a physical storage resource pool. That is, the storage resources in the storage resource pool may be pure virtual storage resources, pure physical storage resources, or a combination of virtual storage resources and physical storage resources.

In some embodiments, the virtual storage resource pool includes: a virtualized high-performance storage resource and a virtualized low-performance storage resource. A performance parameter of the virtualized high-performance storage resource is superior to (better than) a preset performance index, and a performance parameter of the virtualized low-performance storage resource is inferior to (worse than) the preset performance index.

In some embodiments, the unified storage access interface includes one or a combination of the following: a first access interface, a second access interface, and a third access interface. The first access interface is configured for the virtualization function module to access the virtualized high-performance storage resource. The second access interface is configured for the virtualization function module to access the virtualized low-performance storage resource. The third access interface is configured for the virtualization function module to directly access a physical storage resource in the physical storage resource pool.

In practical applications, the combination of these access interfaces can be configured automatically according to the change of the storage resources. For example, a unified storage access interface may include only a first access interface, only a second access interface, only a third access interface, or a combination of at least two access interfaces.

At BZ5, the MEP feeds back MEC-CDN node generation state information to the MEAO.

The MEC-CDN node generation state information includes metadata information of the MEC-CDN node, such as an IP address, a port, current capability state monitoring data (for example, a load condition of the node), and so on.

At BZ6, the MEAO feeds back the MEC-CDN node generation state information to the CDN management node.

At BZ7, the CDN management node performs an initialization operation on the newly generated MEC-CDN node, including, for example, parameter configuration, policy update, establishing a heartbeat connection, etc., and updates the MEC-CDN node information to a CDN node cluster, so as to realize connection of the MEC-CDN node to the CDN.

At BZ8, the CDN management node adjusts storage resource adjustment policy data in the storage resource management module according to practical requirements.

During an operation process of the MEC-CDN node, in response to an adjustment request sent by an external function module (e.g. an MEC-APP, a CDN management node and other logic modules of an MEC service system), the storage resource management module dynamically adjusts a storage resource allocated by at least one MEC-APP in the MEC-CDN node. Alternatively, the storage resource management module dynamically adjusts the storage resources allocated by the MEC-APP based on a preset storage resource adjustment policy according to the MEC-APP monitoring data provided by the MEC system.

FIG. 8 is a structural block diagram of a CDN management node according to some embodiments of the present disclosure. As shown in FIG. 8, the CDN management node can be used to implement the management method provided in the embodiments shown in FIG. 2 to FIG. 4. The CDN management node includes: a sending module and a connection processing module.

The sending module is configured to send a node creation request to an MEAO, so that the MEAO controls an MEP to perform node instantiation processing to generate an MEC-CDN node, wherein the MEC-CDN node includes at least one virtualization function module that supports a service operation; and the virtualization function module accesses a storage resource pool via a unified storage access interface provided by a storage resource management module.

The connection processing module is configured to connect the MEC-CDN node to a CDN.

FIG. 9 is a structural block diagram of an MEAO according to some embodiments of the present disclosure. As shown in FIG. 9, the MEAO may be used to implement the management method provided in the embodiments shown in FIG. 5, and the MEAO includes an orchestrating module and a first controlling module.

The orchestrating module is configured to perform, in response to a node creation request sent by a CDN management node, resource orchestration according to the node creation request.

The controlling module is configured to control an MEP to perform node instantiation processing to generate an MEC-CDN node, wherein the MEC-CDN node includes at least one virtualization function module that supports a service operation; and the virtualization function module accesses the storage resource pool via a unified storage access interface provided by a storage resource management module.

FIG. 10 is a structural block diagram of an MEP according to some embodiments of the present disclosure. As shown in FIG. 10, the MEP may be configured to implement the management method provided in the embodiments shown in FIG. 6. The MEP includes a generating module and a feedback module.

The generating module is configured to perform node instantiation processing in response to control of an MEAO, so as to generate an MEC-CDN node, wherein the MEC-CDN node includes at least one virtualization function module that supports a service operation; and the virtualization function module accesses a storage resource pool via a unified storage access interface provided by the storage resource management module.

The feedback module is configured to feed back MEC-CDN node generation state information to the MEAO.

For the specific description of the CDN management node, the MEAO and the MEP, reference may be made to the corresponding content in the foregoing embodiments, and details are not repeated herein.

The embodiments of the present disclosure also provide an electronic device including one or more processors and a memory; one or more programs are stored in the memory, and when the one or more programs are executed by the one or more processors, the one or more processors implement the management method provided in any one of the foregoing embodiments.

The embodiments of the present disclosure also provide a computer readable medium, on which a computer program is stored, wherein when the program is executed by a processor, the management method provided by any one of the above embodiments is implemented.

Those having ordinary skill in the art can appreciate that all or some of the operations of the methods disclosed above, and the functional blocks/units in the systems and apparatuses can be implemented as software, firmware, hardware, and any suitable combination thereof. In a hardware implementation, the division between functional modules/units provided in the above description does not necessarily correspond to the division of physical components; for example, one physical component may have multiple functions, or one function or operation may be cooperatively performed by several physical components. Some or all of the physical components may be implemented as software executed by a processor, such as a central processor, digital signal processor, or microprocessor, or as hardware, or as an integrated circuit, such as an application specific integrated circuit. Such software may be distributed on computer readable media, which may include computer storage media (or non-transitory media) and communication media (or transitory media). As is well known to those having ordinary skill in the art, the term computer storage media includes both volatile and nonvolatile, removable and non-removable media implemented in any method or technology for storage of information (such as computer readable instructions, data structures, program modules, or other data). Computer storage media includes, but is not limited to, RAM, ROM, EEPROM, flash memory or other memory technology, CD-ROM, DVD or other optical disk storage, magnetic cassettes, magnetic tape, magnetic disk storage or other magnetic storage devices, or any other medium which can be used to store the desired information and which can be accessed by a computer. In addition, communication media typically embodies computer readable instructions, data structures, program modules, or other data in a modulated data signal such as a carrier wave or other transport mechanism and may include any information delivery media as is known to those having ordinary skill in the art.

Exemplary embodiments have been disclosed herein. While specific terms are employed, they are used and should be interpreted in a generic and descriptive sense only and not for purposes of limitation. In some instances, as would be apparent to those having ordinary skill in the art, features, characteristics, and/or elements described in connection with a particular embodiment may be used singly or in combination with features, characteristics, and/or elements described in connection with other embodiments unless specifically indicated otherwise. It will thus be understood by those having ordinary skill in the art that various changes in form and details may be made therein without departing from the scope of the present disclosure as set forth in the appended claims.

What is claimed is:

1. A management method for Content Delivery Network (CDN) function virtualization, performed by a CDN management node and comprising:
    sending a node creation request to a Mobile/Multi-access Edge Application Orchestrator (MEAO), so that the MEAO controls a Mobile/Multi-access Edge computing Platform (MEP) to perform node instantiation processing to generate a Mobile/Multi-access Edge Computing-CDN (MEC-CDN) node, wherein the MEC-CDN node comprises at least one virtualization function module that supports a service operation, and the virtualization function module accesses a storage resource pool via a unified storage access interface provided by a storage resource management module; and
    connecting the MEC-CDN node to a CDN.

2. The method according to claim 1, further comprising: providing a configuration template of the MEC-CDN node to be generated to the MEAO.

3. The method according to claim 2, wherein a first generation instruction is recorded in the configuration template, so that the MEAO controls, according to the first generation instruction, the MEP to configure, in a platform of the MEP, the storage resource management module;
    or, a second generation instruction is recorded in the configuration template, so that the MEAO controls, according to the second generation instruction, the MEP to instantiate the storage resource management module by taking the storage resource management module as a virtualization function module;
    or, a third generation instruction is recorded in the configuration template, so that the MEAO controls, according to the third generation instruction, a virtual abstraction layer of the storage resource pool to configure the storage resource management module.

4. The method according to claim 1, further comprising:
    sending a storage resource adjustment request to the storage resource management module, so that the storage resource management module adjusts a storage resource corresponding to at least one virtualization function module in the MCE-CDN node.

5. The method according to claim 1, further comprising:
    sending a policy adjustment request to the storage resource management module, so as to adjust storage resource adjustment policy data in the storage resource management module.

6. The method according to claims 1, wherein storage resource adjustment policy data is further configured in the storage resource management module, and the storage resource adjustment policy data is used by the storage resource management module to dynamically adjust, according to a preset adjustment policy, a storage resource allocated by each virtualization function module in the MEC-CDN node.

7. The method according to claims 1, wherein the storage resource pool comprises a virtual storage resource pool and/or a physical storage resource pool.

8. The method according to claim 7, wherein the virtual storage resource pool comprises a virtualized high-performance storage resource and a virtualized low-performance storage resource; and
    a performance parameter of the virtualized high-performance storage resource is better than a preset performance index, and a performance parameter of the virtualized low-performance storage resource is worse than the preset performance index.

9. The method according to claim 8, wherein the unified storage access interface comprises one or a combination of following interfaces: a first access interface, a second access interface, and a third access interface;
    wherein the first access interface is configured for the virtualization function module to access the virtualized high-performance storage resource;
    the second access interface is configured for the virtualization function module to access the virtualized low-performance storage resource;
    the third access interface is configured for the virtualization function module to directly access a physical storage resource in the physical storage resource pool.

10. A management method for Content Delivery Network (CDN) function virtualization, performed by a Mobile/Multi-access Edge Application Orchestrator (MEAO) and comprising:
    in response to a node creation request sent by a CDN management node, performing resource orchestration according to the node creation request; and controlling a Mobile/Multi-access Edge computing Platform (MEP) to perform node instantiation processing so as to generate a Mobile/Multi-access Edge Computing-CDN (MEC-CDN) node, wherein the MEC-CDN node comprises at least one virtualization function module that supports a service operation, and the virtualization function module accesses an storage resource pool via a unified storage access interface provided by a storage resource management module.

11. The method according to claim 10, wherein address information of a configuration template is recorded in the node creation request; and
performing resource orchestration according to the node creation request comprises:
obtaining the configuration template according to the address information; and
performing resource orchestration according to the configuration template.

12. The method according to claim 11, wherein a first generation instruction is recorded in the configuration template, and the method further comprises: controlling, according to the first generation instruction, the MEP to configure, in a platform of the MEP, the storage resource management module;
or, a second generation instruction is recorded in the configuration template, and controlling the MEP to perform node instantiation processing comprises: controlling, according to the second generation instruction, the MEP to instantiate the storage resource management module by taking the storage resource management module as a virtualization function module;
or, a third generation instruction is recorded in the configuration template, and the method further comprises: controlling, according to the third generation instruction, a virtual abstraction layer of the storage resource pool to configure the storage resource management module.

13. The method according to claim 10, wherein storage resource adjustment policy data is further configured in the storage resource management module, and the storage resource adjustment policy data is used by the storage resource management module to dynamically adjust, according to a preset adjustment policy, a storage resource allocated by each virtualization function module in the MEC-CDN node.

14. A management method for Content Delivery Network (CDN) function virtualization, performed by a Mobile/Multi-access Edge computing Platform (MEP) and comprising:
in response to control of a Mobile/Multi-access Edge Application Orchestrator (MEAO), performing node instantiation processing to generate a Mobile/Multi-access Edge Computing-CDN (MEC-CDN) node, wherein the MEC-CDN node comprises at least one virtualization function module that supports a service operation, and the virtualization function module accesses a storage resource pool via a unified storage access interface provided by a storage resource management module; and
feeding back MEC-CDN node generation state information to the MEAO.

15. The method according to claim 14, wherein the method further comprises:
configuring, in a platform of the MEP, the storage resource management module in response to control of the MEAO;
or, in a process of performing node instantiation processing, instantiating the storage resource management module by taking the storage resource management module as a virtualization function module;
or, configuring the storage resource management module in a virtual abstraction layer of the storage resource pool.

16. The method according to claim 14, wherein storage resource adjustment policy data is further configured in the storage resource management module, and the storage resource adjustment policy data is used by the storage resource management module to dynamically adjust, according to a preset adjustment policy, a storage resource allocated by each virtualization function module in the MEC-CDN node.

17. A Content Delivery Network (CDN) management node, comprising:
one or more processors; and
a memory, on which one or more programs are stored, wherein the one or more processors, when executing the one or more programs, implement the method according to claim 1.

18. A Mobile/Multi-access Edge Application Orchestrator (MEAO), comprising:
one or more processors; and
a memory, on which one or more programs are stored, wherein the one or more processors, when executing the one or more programs, implement the method according to claim 10.

19. A Mobile/Multi-access Edge computing Platform (MEP), comprising:
one or more processors; and
a memory, on which one or more programs are stored, wherein the one or more processors, when executing the one or more programs, implement the method according to claim 14.

20. A non-transitory computer readable medium, on which a computer program is stored, wherein when the program is executed by a processor, the method according to claim 1 is implemented.

* * * * *